United States Patent

Waren

[15] 3,682,316
[45] Aug. 8, 1972

[54] APPARATUS FOR THE COLLECTION OF BUOYANT FOREIGN MATTER

[72] Inventor: Frank Arthur Oakley Waren, 301A Kingsway, Hove, Sussex, England

[22] Filed: March 3, 1970

[21] Appl. No.: 16,195

[52] U.S. Cl. .......................... 210/242, 210/DIG. 21
[51] Int. Cl. .................................................. C02b 9/02
[58] Field of Search..210/169, 83, 242, 523, DIG. 21

[56] References Cited

UNITED STATES PATENTS

| | | | |
|---|---|---|---|
| 2,876,903 | 3/1959 | Lee | 210/242 |
| 3,508,661 | 4/1970 | Diemond et al. | 210/169 |
| 3,219,190 | 11/1965 | Thune | 210/523 |
| 3,348,690 | 10/1967 | Cornelissen | 210/242 |
| 3,537,587 | 11/1970 | Kain | 210/242 |
| 3,237,774 | 3/1966 | Schuback | 210/242 |
| 1,591,024 | 7/1926 | Dodge | 210/242 |

*Primary Examiner*—Reuben Friedman
*Assistant Examiner*—T. A. Granger
*Attorney*—Berman, Davidson & Berman

[57] ABSTRACT

Apparatus for collecting buoyant foreign matter (particularly oil) floating on the surface of water comprising a tank adapted to float on water, an outlet at the bottom of the tank, an inlet track positioned to draw in water at or near the surface and means for pumping water together with the foreign matter through the inlet track into the tank, where the foreign matter rises and is trapped in the tank, whilst the water passes out through the outlet. The bottom of the tank is preferably open. The pumping means may comprise one or more impellers located in the inlet track driven by a motor carried on the tank.

11 Claims, 6 Drawing Figures

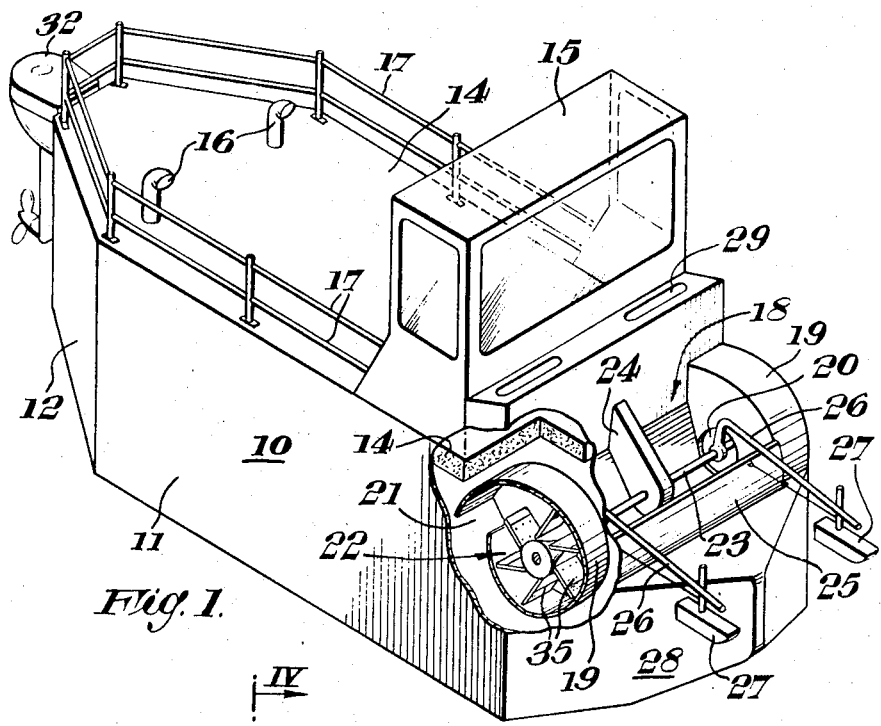
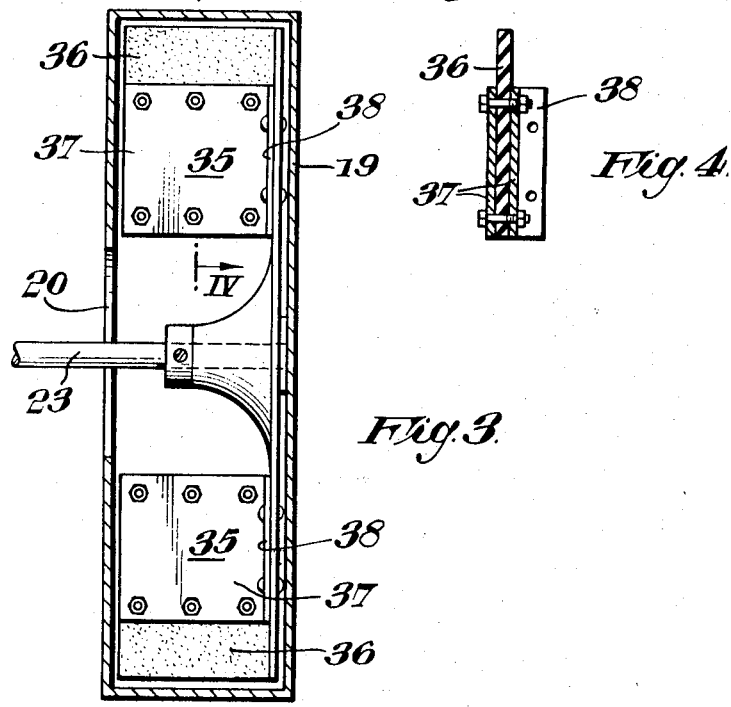

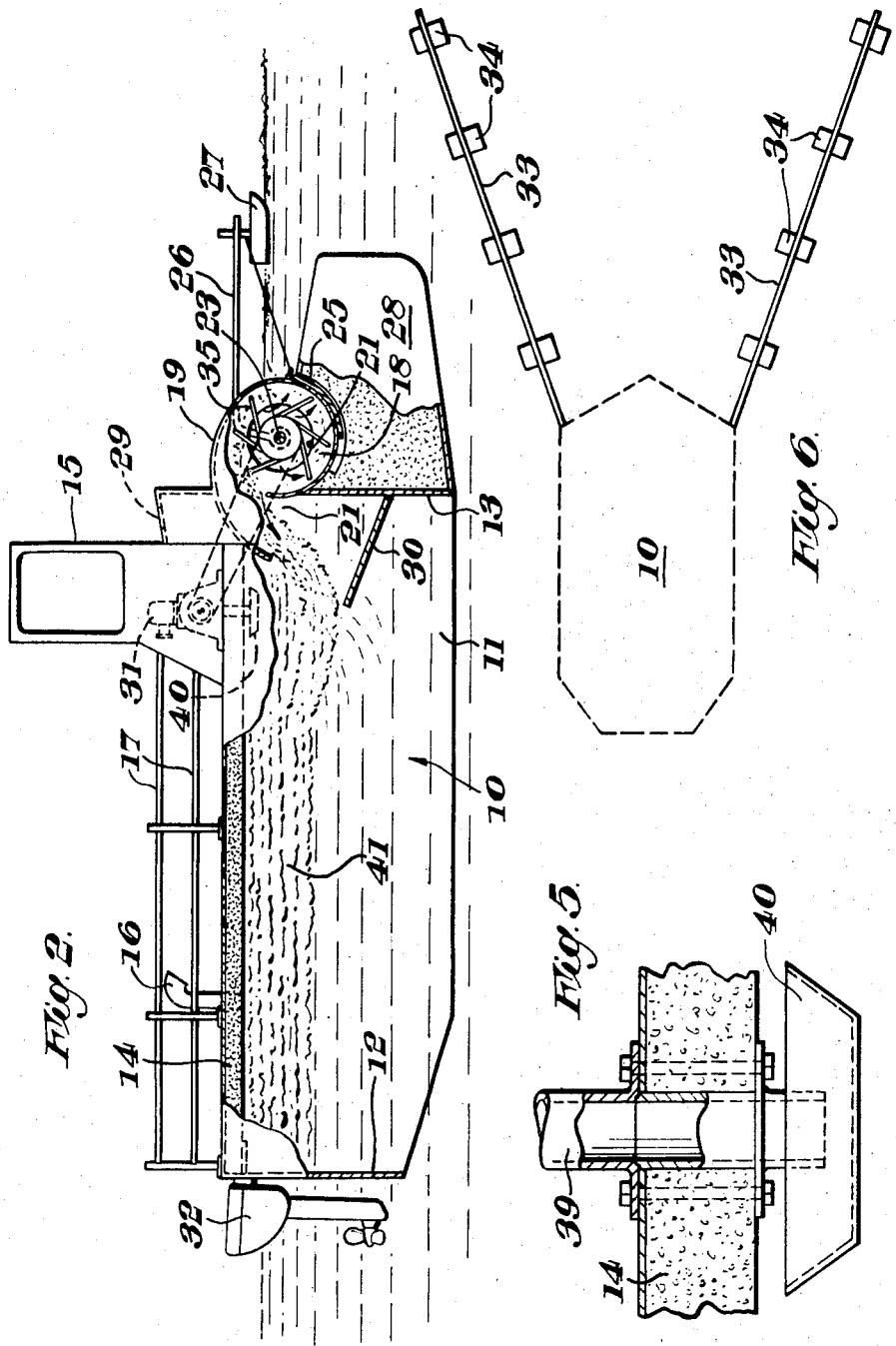

APPARATUS FOR THE COLLECTION OF BUOYANT FOREIGN MATTER

This invention relates to apparatus for collecting buoyant foreign matter i.e. foreign matter floating on or near the surface of water and is particularly applicable to the collection of oil spilt from ships which floats in patches or slicks on the surface of the sea.

According to the present invention there is provided apparatus for collecting buoyant foreign matter floating on or near the surface of water comprising a tank adapted to float on water, said tank having at least one outlet at or adjacent the bottom thereof, an inlet tract, and means for pumping water into said tank through said inlet tract, said inlet tract being positioned to draw in water from a level at or near the surface when said tank is floating in water, the arrangement being such that buoyant foreign matter pumped into the tank with the water remains in the upper part of said tank while the water passes out through said outlet or outlets.

The tank may comprise a pair of opposed side walls, a front wall, a rear wall and a top in the form of a buoyant deck. Conveniently, the bottom of the tank is open to form the outlet. The rear wall may be appropriately shaped to improve the navigational properties of the tank, and a shaped bow may be provided in front of the front wall for the same purpose.

The inlet tract may include a trough located at the upper part of the front wall of the tank (and above the low part where this is present), the trough having an outer lip adapted to be positioned at a predetermined depth below the surface of the water in which the tank is floating. The trough preferably extends substantially the full width of the front wall and communicates with the interior of the tank through at least one passage opening into the tank adjacent the top thereof. In a preferred embodiment, the outer lip of the trough is formed as a separate element movable on the trough and adjustable relative to the tank by means of a float arrangement connected to the lip, so as to maintain the lip at a predetermined depth. The inlet tract may include a filter arrangement which enables oil to be pumped into the tank while preventing flotsam and jetsam such as seaweed from being pumped into the tank.

The means for pumping may comprise at least one impeller located in the inlet tract, the impeller conveniently being driven by a motor mounted on the tank. Preferably an impeller is located at either end of the trough, each impeller being arranged to deliver water through a respective passage communicating with the interior of the tank. The impellers may be mounted on a common shaft driven by the motor. This shaft may be provided with means for breaking up agglomerated foreign matter, e.g. agglomerated lumps of oil. Such means may, for example, comprise a plurality of fingers extending from and spaced around and along the shaft.

Guide means may be provided to guide the foreign matter into the inlet tract and the guide means may include a V-shaped boom arrangement comprising a series of blocks of a buoyant material from which a skirt depends into the water. The boom may be suspended from arms carried by the tank or each of the outer ends of the limbs of the V may be connected to a boat by which the tank may be towed through the water. The said buoyant material may be expanded Polystyrene. The top of the tank may be formed of the same material, or alternatively it may be in the form of a closed buoyancy chamber.

At least the walls of the tank may be made of resin-bonded glass fiber. The top of the tank may also be made of this material, provided that it is formed as a buoyancy chamber or lined with a buoyant material, such as expanded polystyrene.

The side walls and upper wall of the tank may be formed of a series of elements connected together. Adjacent elements may be connected by a flexible coupling which may comprise polythene or rubber sheeting, so that the elements are capable of moving relative to one another.

One embodiment of the invention adapted to collect patches of oil floating on the surface of the sea will now be described with reference to the drawings, in which:

FIG. 1 is a perspective view of apparatus according to the invention;

FIG. 2 is a side sectional view of the apparatus of FIG. 1 in use;

FIG. 3 is an end sectional view of one impeller of the apparatus of FIG. 1 and 2;

FIG. 4 is a section along the line IV—IV of FIG. 3;

FIG. 5 is a schematic side view of the inlet to the discharge pump of the apparatus of FIGS. 1 and 2; and FIG. 6 is a schematic view of the apparatus of FIGS. 1 and 2 showing the guide booms in position.

The apparatus illustrated comprises a tank 10 having a pair of opposed side walls 11, a rear wall 12 which is of angled form to improve the navigational performance of the craft, and a front wall 13, the walls being made of any suitable material, such as metal or resin-bonded glass fiber. The top of the tank is closed by a buoyant deck 14 made of expanded polystyrene or similar buoyant material. The deck is provided with a cabin 15 for the operator, which also houses a motor for driving means for pumping sea water into the tank and a pump for discharging collected oil from the tank, air vents 16 to enable air trapped in the tank to be released, and guard rails 17. The bottom of the tank is open. The buoyancy of the tank is arranged to be such that the tank floats on the sea submerged substantially to deck level.

An inlet tract is located on the front wall 13. This inlet tract comprises a trough 18 and impeller housings 19 located at either end of the trough. The housings 19 communicate with the trough 18 through openings 20 in their inner side walls and also with the interior of the tank through openings 21 in the top thereof.

Within the housings 19 impellers 22 are mounted on a shaft 23 extending through the trough 18 and driven by a motor housed on the deck through a suitable drive band or like means housed within a housing 24 extending from the wall 13.

The trough 18 which, as shown in FIG. 2, is of arcuate section is provided with a movable outer lip portion 25 also of arcuate section and adapted to slide over the fixed part of the trough 18. The lip portion 25 is carried by arms 26 pivotally mounted on the shaft 23, the arms extending forwards beyond the front wall 13 and terminating in floats 27, by means of which the top edge of the lip portion 25 is maintained at a predetermined depth beneath the surface of the sea. The floats are adjustable so that the depth of the lip portion may be adjusted as desired.

In order to improve the navigational characteristics of the apparatus, a shaped low portion 28 is provided in front of the wall 13 below the trough 18.

Further air vents 29 are provided above the openings 21 through which water is transferred by the impellers into the tank. One or more baffles 30 extend from the inner face of the front wall 13 within the tank in the path of water entering the tank through the openings 21 in order to prevent oil swept in with the water from passing directly out through the open bottom of the tank.

The motor used to drive the impellers 22 may be a battery-driven electric motor or a conventional internal-combustion engine. This engine may also be used to drive a pump 31 mounted on the deck and serving to discharge oil collected within the tank.

The tank is provided with an outboard motor 32 mounted on the rear wall 12, so that it may be self-driven. Means (not shown) for steering the tank are also provided.

In order to guide foreign matter into the inlet tract, guide means are provided in the form of a V-shaped floating boom, extending forwardly of the tank, as shown in FIG. 6. This boom comprises two arms 33 extending one either side of the inlet tract and supported on a series of floats 34 made of a buoyant material, each of the arms having a skirt depending therefrom into the water. The boom thus forms a catchment area for oil floating on the surface of the sea and serves to guide it into the inlet tract.

The impeller structure is shown in FIGS. 3 and 4. Within the housing 19, the impeller blades 35 are mounted on a circular plate 36 carried by the shaft 23 and located adjacent the outer wall of the housing. Each blade 35 comprises a central sheet 36 made of rubber or other resilient material having on either side thereof metal plates 37 bolted together so as to sandwich the greater part of the sheet 36 between them. The plates 37 do not, however, extend to the tip of the blade, so that the tip is formed only by the resilient sheet 36. This permits deformation of the blade tips should a solid foreign body (e.g. a bottle) be swept into the housing 19 so as to allow the foreign body to pass into the tank without damage to the blades. One of the plates 37 is provided with a flange 38 by means of which the blade is mounted on the plate 36.

The pump 31 for discharging oil from the tank is provided with an inlet tube 39 (FIG. 5) passing through the top of the tank and terminating within a saucer-shaped member 40, the open end of which is spaced as close to the inner face of the top of the tank as is consistent with oil flowing to the pump. This enables the maximum amount of the collected oil to be discharged from the tank.

In operation, the tank is taken to the area of the sea in which an oil slick or patch has been located and is then driven into contact with the edge of the oil patch. The motor and driving the impellers 22 is then started and a large volume of water and oil mixture is thus drawn over the outer lip of the trough through the openings 20, past the impellers and into the interior of the tank through the openings 21. Since the oil tends to float on the surface of the water, the oil tends to rise up inside the tank until it collects adjacent the underside of the top of the tank, as indicated at 41 in FIG. 2. The sea water, however, being heavier than the oil, tends to be displaced by the oil and consequently, leaves the tank through the open bottom thereof. Thus the oil on the surface of the sea is collected in the tank and when the tank is full it may be taken back to harbor for the oil to be pumped out by means of the pump 31. Alternatively, the oil may be pumped out of the tank while the apparatus is in operation so that the oil may then be collected in drums or other suitable containers, or in another vessel, and be taken away without hindering the collection of the oil.

As previously stated, the tank may comprise a series of elements each having a pair of opposed side walls and an upper wall, the upper wall being buoyant, the elements being connected together to thus form a long tank of inverted U section. The elements may be so connected by flexible connection so that in rough seas, the individual elements of the tank may move relative one to another to avoid excessive strains on the tank. The flexible connections may be in the form of sheets of synthetic plastics material or rubber which connect adjacent elements together in such a way as to permit relative motion but to prevent oil escaping between the elements. When such separate elements are used to form the tank, the length and thus the capacity of the tank may be varied at will by using more or fewer elements.

The tank may also be provided with means (not shown) for preventing seaweed and like foreign matter from being drawn into the tank with the water and oil and thus perhaps fouling the impellers. The means may comprise a pair of contra-rotating endless belts mounted on the front wall of the tank and extending into the trough, each provided with outwardly extending fingers. The water and oil are drawn in between the belts and any seaweed or the like is caught by the fingers and raised by the belt system to the deck level of the tank where it may be collected. The belt system may conveniently be driven by the motor driving the impellers, or alternatively by an independent motor.

Particularly when a belt system is provided, the tank may be divided substantially into two parts on a catamaran principle, the floats of the catamaran each comprising oil storage tanks with the space between the tanks being used for collecting seaweed etc. In this case separate inlet tracts may be provided on each side of the belt system, each tract loading to one of the storage tanks. The impellers in the tracts may each have their own motor or may be driven by a common motor.

While the tank described has an open bottom which provides the outlet for the water the outlet may equally well comprise an outlet port included in a bottom wall or the bottom wall may itself be perforated or otherwise arranged to permit the passage therethrough of sea water. The tank may, as described, be self-propelled having its own propelling motor and steering gear, but alternatively, it may be towed by a boat or boats. It will also be appreciated that while the invention is particularly applicable to the removal of oil from the surface of the sea, other foreign matter such as seaweed, plankton or general flotsam and jetsam may be equally well collected.

What I claim as my invention and desire to secure by letters patent of the united states is:

1. Apparatus for collecting buoyant foreign matter floating on or near the surface of a body of water, comprising a tank having opposed sidewalls, front and rear walls and a top wall and being adapted to float in said body of water, said tank having at least one outlet near the bottom thereof below the surface of said body of water, an inlet tract on said tank communicating with the surface of said body of water, means for pumping water into said tank through said inlet tract, said inlet tract including a trough located at the upper part of the front wall of said tank and having an outer lip portion, said trough and said outer lip portion both being part circular in section and said outer lip portion being mounted coaxially with said trough and being rotatable about the common axis to adjust the height of said outer lip portion relative to the surface of said body of water, and a float arrangement including a pair of arms rigidly connected to and extending forwardly of said outer lip portion and terminating in float members, said float arrangement serving to maintain the upper edge of said outer lip portion at a predetermined depth below the surface when said tank is floating in said body of water.

2. Apparatus as claimed in claim 1 wherein said pumping means comprises at least one impeller located in the inlet tract driven by a motor mounted on top of said tank.

3. Apparatus as claimed in claim 2 wherein an impeller is located at either end of said trough, each of said impellers being arranged to deliver water through a respective passage communicating with the interior of the tank, and said impellers being mounted on a common shaft extending through said trough.

4. Apparatus as claimed in claim 3 wherein said shaft is provided with means comprising a plurality of fingers extending from and spaced along and around said shaft for breaking up agglomerated foreign matter.

5. Apparatus as claimed in claim 1 wherein at least one baffle is mounted inside said tank in the path of water pumped into said tank through said inlet tract.

6. Apparatus as claimed in claim 1 wherein said tank is provided with guide means for guiding buoyant foreign matter into the inlet tract said guide means comprising a V-shaped boom arrangement projecting from the front of the tank, each limb of said boom arrangement comprising an arm supported by a plurality of blocks of buoyant material and a skirt depending from said arm into the said body of water.

7. Apparatus as claimed in claim 1 wherein the top of said tank is made of expanded polystyrene.

8. Apparatus as claimed in claim 1 wherein the top of said tank is in the form of a closed buoyancy chamber.

9. Apparatus as claimed in claim 1 wherein at least the walls of said tank are made of resin-bonded glass fiber.

10. Apparatus as claimed in claim 1 wherein the side walls and top of said tank are formed from a plurality of elements flexibly connected together.

11. Apparatus as claimed in claim 1, wherein said top wall of the tank is a buoyant deck, the bottom of said tank being open to form said outlet.

* * * * *